(12) United States Patent
Gao et al.

(10) Patent No.: US 10,895,150 B2
(45) Date of Patent: Jan. 19, 2021

(54) DOWNHOLE COMMUNICATION NETWORK

(71) Applicant: Halliburton Energy Services, Inc., Houston, TX (US)

(72) Inventors: Li Gao, Katy, TX (US); Daniel Joshua Stark, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/337,345

(22) PCT Filed: Dec. 7, 2016

(86) PCT No.: PCT/US2016/065407
§ 371 (c)(1),
(2) Date: Mar. 27, 2019

(87) PCT Pub. No.: WO2018/106229
PCT Pub. Date: Jun. 14, 2018

(65) Prior Publication Data
US 2020/0032646 A1 Jan. 30, 2020

(51) Int. Cl.
*E21B 47/12* (2012.01)
*E21B 47/26* (2012.01)
(Continued)

(52) U.S. Cl.
CPC .............. *E21B 47/26* (2020.05); *E21B 47/13* (2020.05); *E21B 47/14* (2013.01); *H04L 67/125* (2013.01)

(58) Field of Classification Search
CPC ...... E21B 47/124; E21B 47/122; E21B 47/14; H04L 67/125
See application file for complete search history.

(56) References Cited

U.S. PATENT DOCUMENTS 6,028,534 A * 2/2000 Ciglenec ................... E21B 7/06
340/856.2
6,898,529 B2 5/2005 Gao et al.
(Continued)

FOREIGN PATENT DOCUMENTS

WO 2015153537 A1 10/2015

OTHER PUBLICATIONS

International Search Report & Written Opinion issued for corresponding International Application No. PCT/US2016/065407 dated Aug. 25, 2017. (17 pages).
(Continued)

*Primary Examiner* — Munear T Akki
(74) *Attorney, Agent, or Firm* — McGuireWoods LLP

(57) ABSTRACT

The disclosed embodiments include downhole communication networks and methods to form downhole communication networks. In one embodiment, a downhole communication network includes a plurality of communication tags deployed in a wellbore. Each communication tag of the plurality of communication tags includes a sensor operable to detect wellbore and hydrocarbon resource properties proximate the respective communication tag. Each communication tag of the plurality of communication tags also includes a storage medium operable to store data indicative of the at least one of wellbore and hydrocarbon resource properties proximate the respective communication tag. Each communication tag of the plurality of communication tags further includes a transmitter operable to transmit a signal indicative of one or more of the wellbore and hydrocarbon resource properties. Each communication tag of the plurality of communication tags further includes a power source operable to provide power to one or more components of the respective communication tag.

20 Claims, 5 Drawing Sheets

(51) Int. Cl.
  *E21B 47/14* (2006.01)
  *H04L 29/08* (2006.01)
  *E21B 47/13* (2012.01)

(56) References Cited

U.S. PATENT DOCUMENTS

| | | | |
|---|---|---|---|
| 7,397,388 B2 | 7/2008 | Huang et al. | |
| 7,407,111 B2 | 8/2008 | Hartmann | |
| 7,602,668 B2 | 10/2009 | Liang et al. | |
| 7,712,527 B2 | 5/2010 | Roddy | |
| 2003/0235113 A1 | 12/2003 | Da Silva et al. | |
| 2006/0250243 A1* | 11/2006 | Masino | E21B 47/12 340/572.1 |
| 2008/0106972 A1* | 5/2008 | Liang | E21B 47/12 367/25 |
| 2008/0253228 A1* | 10/2008 | Camwell | H04W 40/10 367/82 |
| 2014/0111349 A1 | 4/2014 | Roberson et al. | |
| 2014/0269188 A1* | 9/2014 | van Zelm | H04L 1/1657 367/81 |
| 2015/0330190 A1* | 11/2015 | Wu | E21B 41/0092 703/6 |
| 2016/0010447 A1 | 1/2016 | Merino | |
| 2016/0237811 A1* | 8/2016 | Reed | E21B 47/12 |
| 2020/0032643 A1* | 1/2020 | Gao | E21B 47/00 |

OTHER PUBLICATIONS

Beeman et al., "Design and Performance of Radio Telemetry Systems for Assessing Juvenile Fish Passage at Three Hydroelectric Dams, in Telemetry Techniques:" A User Guide for Fisheries Research, N.S. Adams, J.W. Beeman, and J.H. Eiler, Editors. 2012, American Fisheries Society; pp. 281-337.

Liu, Xuan Chao, Yan Xia He, and Guo Hong Li. "A new type of electroacoustic transducer used for downhole acoustic telemetry system." Applied Mechanics and Materials. vol. 336. Trans Tech Publications Ltd, 2013.

Zhao, Yi, and Joshua R. Smith. "A battery-free RFID-based indoor acoustic localization platform." 2013 IEEE International Conference on RFID (RFID). IEEE, 2013.

Khan, Farid Ullah. "State of the art in acoustic energy harvesting." Journal of Micromechanics and Microengineering 25.2 (2015): 023001.

IEEE 1902.1 Working Group. "IEEE Standard for long wavelength wireless network protocol." IEEE Std 2009 (1902).

Singh, Shio Kumar, M. P. Singh, and Dharmendra K. Singh. "Routing protocols in wireless sensor networks—A survey." International Journal of Computer Science & Engineering Survey (IJCSES) 1.2 (2010): 63-83.

\* cited by examiner

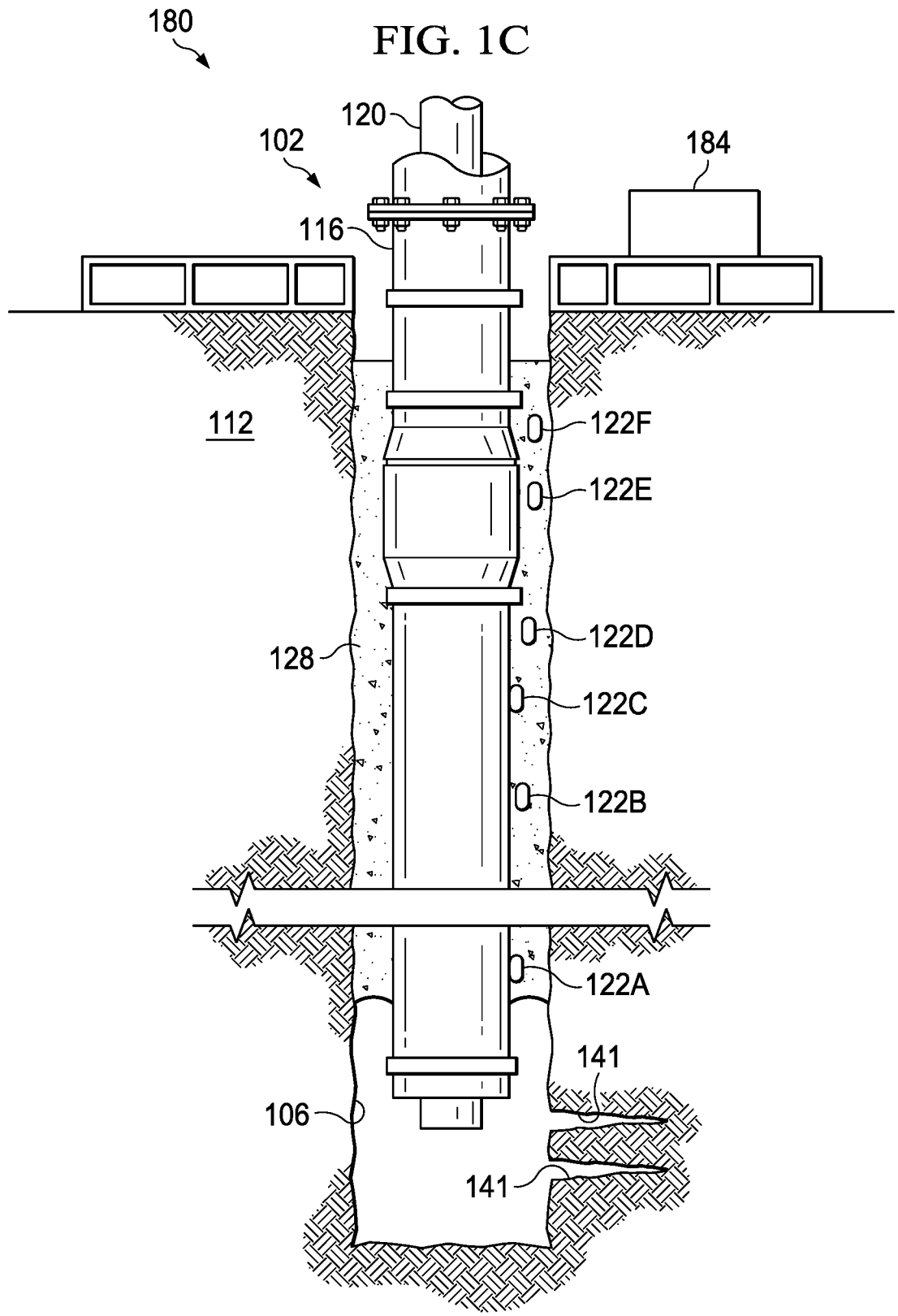

DOWNHOLE COMMUNICATION NETWORK

BACKGROUND

The present disclosure relates generally to downhole communication networks as well as methods to form downhole communication networks.

A wellbore is often drilled proximate to a subterranean deposit of hydrocarbon resources to facilitate exploration and recovery of hydrocarbon resources. Up-to-date data indicative of one or more properties of the wellbore and indicative of the physical and chemical properties of the hydrocarbon resources are critical for evaluating the operational safety of hydrocarbon exploration and production, and also for assessing hydrocarbon production during hydrocarbon exploration and production.

Further, surface based technicians often operate downhole tools, some of which are deployed several thousand feet underground. However, it is often difficult to establish and to maintain communication with the downhole tools during hydrocarbon exploration and production.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 1C illustrates a production environment in which the downhole communication network of FIG. 1A is deployed in the wellbore;

Figure 1A:
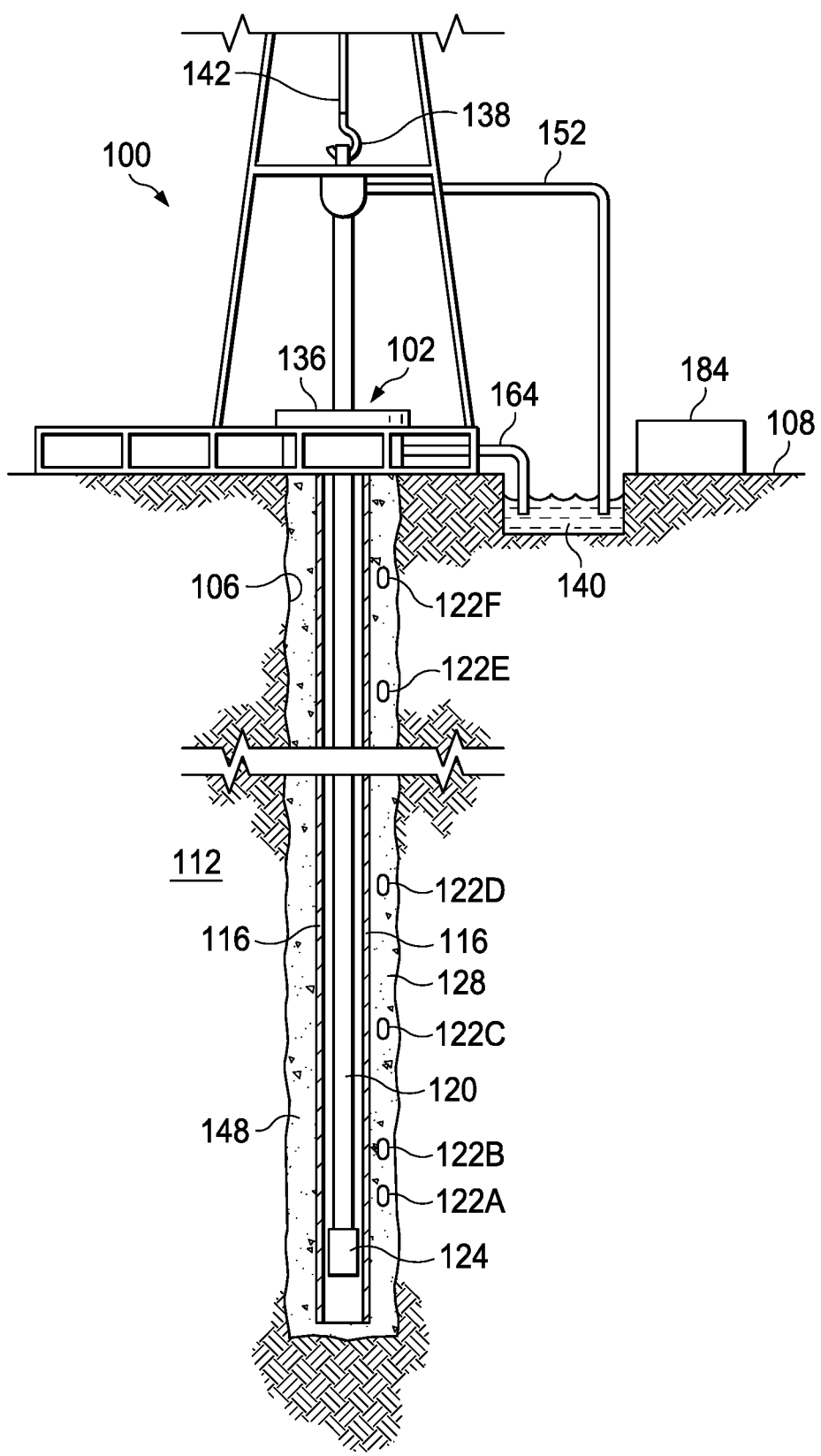
FIG. 1A illustrates a schematic view of a well environment in which a downhole communication network having a plurality of communication tags is deployed in a wellbore.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to downhole communication networks and methods to form downhole communication networks. Multiple communication tags are deployed along a wellbore of a hydrocarbon drilling, production or exploration environment. As defined herein communication tags include any type of devices operable to detect at least one of wellbore and hydrocarbon resource properties described herein and transmit a signal indicative of the at least one wellbore and hydrocarbon resource properties to other communication tags, and/or other downhole or surface based tools or devices. In some embodiments, the communication tags are acoustic communication tags, each having an acoustic transmitter operable to transmit signals indicative of wellbore properties to other acoustic communication tags, and/or other downhole or surface based tools or devices. In other embodiments, the communication tags are electromagnetic tags, each having a transmitter operable to transmit electromagnetic signals indicative of wellbore properties to other electromagnetic tags, and/or other downhole or surface based tools or devices. In further embodiments, the communication tags have acoustic and electromagnetic transmitters and are operable to transmit electromagnetic signals and acoustic signals indicative of wellbore properties to other communication tags and/or other downhole or surface based tools or devices. Additional descriptions of the communication tags and their operations are provided in the paragraphs below and at least FIGS. 1-4 of the drawings.

In certain hydrocarbon production or exploration environments, where casings are deployed and are cemented to the wellbore, the communication tags may be mixed with cement in slush form (cement slush). The cement slush is pumped down the casing and forced through an annulus between the casing and the wellbore. Once the cement slush sets, the communication tags are deployed along the wellbore. The communication tags may also be mixed with liquids that are pumped down the wellbore and may be subsequently deposited along the wellbore. Each communication tag may also be encoded with information indicating in which fluid it was mixed.

In some embodiments, some of the communication tags include at least one sensor for detecting wellbore properties as well as hydrocarbon resource properties. Examples of wellbore properties include temperature, pressure, acoustic impedance, salinity, vibration, acoustic reflectance, resistivity, electrical impedance, electric potential, optical spectra, water cut, gas concentration, pH, noise threshold as well as similar properties proximate the respective communication tag, Examples of hydrocarbon resource properties include a proximate location of hydrocarbon resources relative to the communication tag, material and chemical properties of the hydrocarbon resources, an approximate rate of production of the hydrocarbon resources, as well as similar properties. In such embodiments, other communication tags include transmitters and receivers but do not include sensor components.

Such communication tags are utilized for telemetry, such as between communication tags that perform sensing operations described herein.

Each communication tag may also include a storage medium for storing operational instructions of the respective communication tag as well as data indicative of nearby wellbore and/or hydrocarbon resource properties proximate the respective communication tag. The storage medium may also include an identification of the respective communication tag. Further, each communication tag also includes an acoustic transmitter, an electromagnetic transmitter, or both to transmit an acoustic signal, an electromagnetic signals, or both, to another communication tag, a downhole receiver, or to a downhole transceiver. The communication signals may carry instructions to establish a communication channel to communicatively connect two communications tags. For example, if the communication tag is a communication tag, then the instructions include instructions to establish an acoustic communication network. Further, if the communication tag is an electromagnetic tag, then the instructions include instructions to establish an electromagnetic network. Signals transmitted by the communication tag may also include data indicative of nearby wellbore and/or hydrocarbon resource properties obtained by one of the communications tags. In some embodiments, signals transmitted by the communication tags may further include operational instructions to a downhole tool or device that is communicatively connected to one of the communication tags.

Each communication tag also includes a receiver for receiving signals from another communication tag, a downhole, or surface based tool or device. In some embodiments, the receiver is operable to receive acoustic signals, electromagnetic signals, both of the foregoing types of signals, or other telecommunication signals transmitted by another communication tag, downhole tool, or device. In some embodiments, the transmitter and the receiver together form a transceiver that is operable to transmit and to receive different types of signals described herein. Each communication tag also includes a power source or means to harvest power from the environment that provides power to the other components of the communication tag. In some embodiments, a communication tag of the downhole communication network continuously transmits data indicative of nearby wellbore and/or hydrocarbon resource properties to another communication tag. In other embodiments, the communication tag periodically transmits data. In further embodiments, the communication tag transmits data upon receipt of a signal indicative of a data transmission request. Additional descriptions of various components of the communication tag are provided in further detail in the paragraphs below and are illustrated in at least FIG. 2.

As stated herein, each communication tag may establish communication (a communication channel) with other communication tags within a proximity of the respective communication tag. Multiple communication channels may be established to communicatively connect multiple communication tags, thereby communicatively connecting each of the multiple communication tags along a communication path. As defined herein, a communication path includes multiple communication channels. As such, the communication path communicatively connects multiple communication tags of the downhole communication network, or communicatively connects the multiple communication tags to other downhole and surface based tools and devices. As such, a communication path may be established to communicatively connect a surface based device to multiple communication tags, where signals indicative of wellbore properties proximate the communication tags may be transmitted along the communication path to the surface based device. Further, a communication path may be established to communicatively connect the surface based device to multiple communication tags and to a downhole tool. Moreover, a technician may operate the surface based device to transmit signals indicative of instructions via the communication path to the downhole tool. In some embodiments, the communication path is formed from multiple acoustic communication channels. In other embodiments, the communication path is formed from multiple electromagnetic communication channels. In further embodiments, the communication path is formed from multiple acoustic and electromagnetic communication channels.

The downhole communication network may also dynamically establish new communication channels and form new communication paths to communicatively connect multiple communication tags to a surface based device and/or to a downhole tool. For example, if a first communication tag is within a proximity of a second and a third communication tag, both of which are communicatively connected to the surface based device, the first communication tag may establish a communication channel, such as an acoustic communication channel or electromagnetic communication channel, with the second communication tag. The first communication tag may also transmit signals to the second communication tag, where the signals are then transmitted to the surface based device. However, if the first communication tag determines that the second communication tag is offline, then the first communication tag may dynamically establish a new communication channel with the third communication tag, transmit signals to the third tag, where the transmitted signals are re-transmitted by the third communication tag to the surface based device. Additional descriptions of dynamically establishing new communication channels and communication paths are described in the further detail in the paragraphs below and are illustrated in at least FIGS. 3A, 3B, and 4.

Now turning to the figures, FIG. 1A illustrates a well environment 100 in which a downhole communication network 122A-122F having a plurality of communication tags 122A-122F is deployed in wellbore 106. In the embodiment of FIG. 1A, a well 102 having a wellbore 106 extends from a surface 108 of the well 102 to or through the subterranean formation 112. A casing 116 is deployed along the wellbore 106 to insulate downhole tools and devices deployed in the casing 116, to provide a path for hydrocarbon resources flowing from the subterranean formation 112, to prevent cave-ins, and/or to prevent contamination of the subterranean formation 112. The casing 116 is normally surrounded by a cement sheath 128 formed from cement slush, and deposited in an annulus between the casing 116 and the wellbore 106 to fixedly secure the casing 116 to the wellbore 106 and to form a barrier that isolates the casing 116. Although not depicted, there may be layers of casing concentrically placed in the wellbore 106, each having a layer of cement or the like deposited thereabout.

A hook 138, cable 142, traveling block (not shown), hoist (not shown), and conveyance 120 are provided to lower a downhole tool 124 down the wellbore 106 or to lift the downhole tool 124 up from the wellbore 106. The conveyance 120 may be wireline, slickline, coiled tubing, drill pipe, production tubing, downhole tractor or another type of conveyance that has an internal cavity to provide fluid flow for a mixture containing fluid and communication tags.

At wellhead 136, an inlet conduit 152 is coupled to a fluid source (not shown) to provide fluid mixtures, such as cement slush, drilling fluids, or other fluids that are mixed with communication tags 122A-122F, downhole. The conveyance 120 has an internal cavity that provides a fluid flow path from the surface 108 downhole. The fluid mixture travels down the conveyance 120, and exits the conveyance 120. A downward pressure exerted on the fluid mixture forces the fluid mixture into an annulus 148 between the casing 116 and the surrounding formation 112, and forces the fluid mixture in the annulus to flow towards the surface 108.

In some embodiments, where the fluid mixture includes cement slush and downhole communication tags 122A-122F, the downward pressure is exerted on the cement slush until the annulus 148 is substantially filled with the cement slush. The cement slush is then allowed to solidify to set the casing 116 and the communication tags 122A-122F in place along the wellbore 106. In other embodiments, the communication tags 122A-122F are mixed with a fluid that does not naturally solidify in a wellbore environment. In such embodiments, the fluid deposits the communication tags 122A-122F along the wellbore 106 as the fluid flows back towards the surface 108 through a second wellbore annulus (not shown). The fluid then exits the second wellbore annulus via an outlet conduit 164 where the fluid is captured in a container 140. Although the foregoing paragraphs describe a traditional cementing operation, the well environment illustrated in FIG. 1A also supports reverse circulation cementing operations. In such operations, the fluid mixture travels from an inlet conduit to the annulus 148 and is deposited downhole from the annulus 148.

Figure 1B:
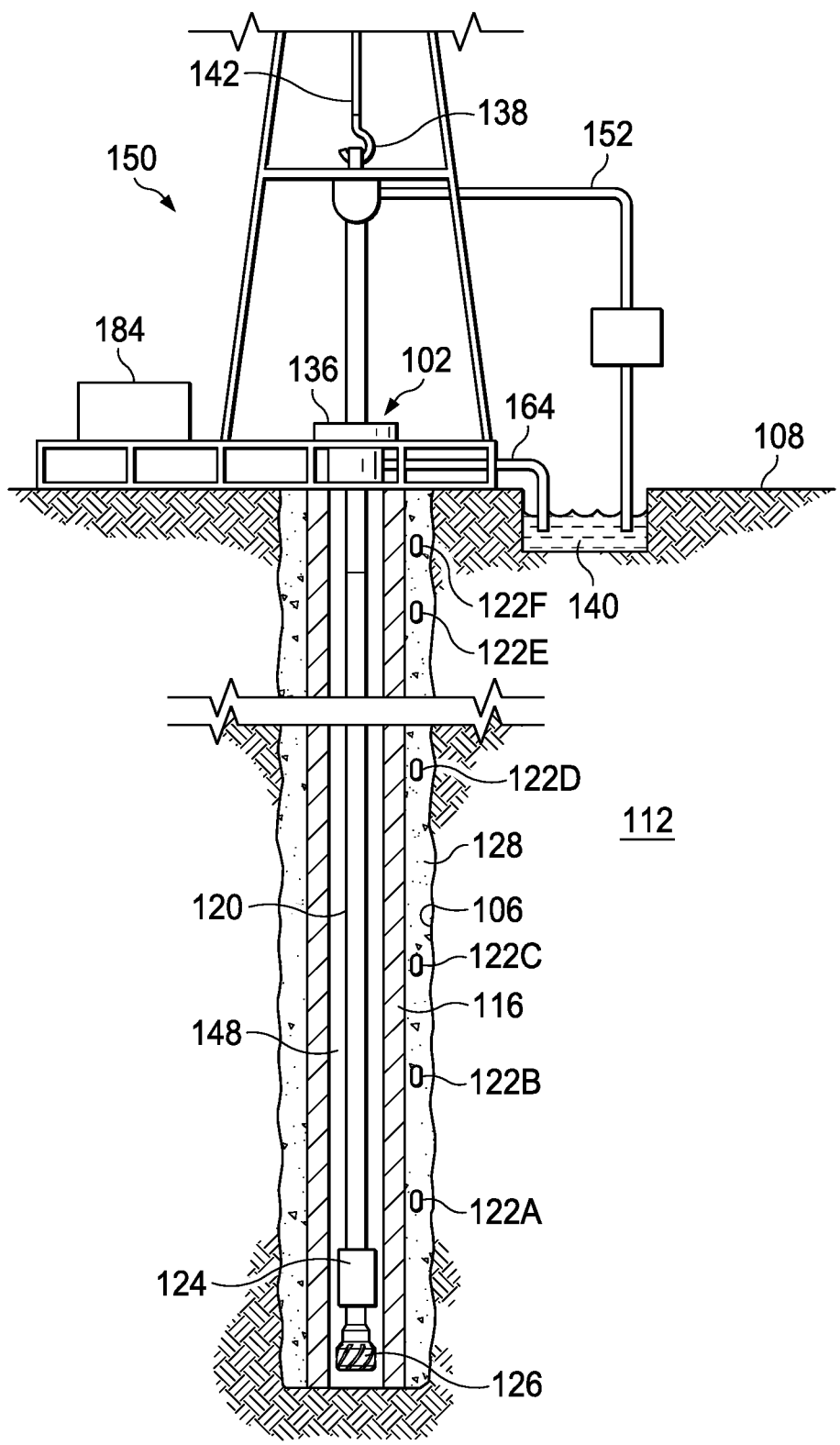
FIG. 1B illustrates a drilling environment in which the downhole communication network of FIG. 1A is deployed in a first section of the wellbore.

In some embodiments, where the cement sheath 128, which contains cement mixture and the communication tags 122A, 122B, 122C, 122D, 122E, and 122F has been formed along a section (first section) of the wellbore 106, downhole tools and devices that are deployed proximate to the first section of the wellbore 106 may utilize the downhole communication network 122A-122F to transmit signals indicative of data and/or instructions along the downhole communication network 122A-122F to another downhole device deployed proximate to the downhole communication network 122A-122F or to a surface based electronic device, such as the controller 184. FIG. 1B illustrates a drilling environment 150 in which the downhole communication network 122A-122F is deployed in the first section of the wellbore 106. In this embodiment, the cement sheath 128 has been deposited along the first section of the wellbore 106. Drill bit 126 is lowered down the wellbore 106 to perform drilling operations on a second section (not shown) of the wellbore 106, which extends beyond the first section of the wellbore 106. During drilling operations, the drill bit 126 and the downhole tool 124 are operable to transmit signals along the downhole communication network 122A-122F to other tools in the wellbore or to the controller 184.

The conveyance 120 has an internal annulus that provides a fluid flow path for fluids such as the cement slush to flow from the surface 108 down to the drill bit 126. In some embodiments, the cement slush contains additional communication tags that may be utilized to form an additional downhole communication network. In one of such embodiments, cement slush containing the additional communication tags are pumped into the second section of the wellbore 106. Moreover, the communication tags of the downhole communication network 122A-122F and the additional communication tags that are deposited in the second section of the wellbore 106 are operable to form a new downhole communication network that extends along both the first section and the second section of the wellbore. In one of such embodiments, the communication tags are operable to dynamically form the new downhole communication network to provide a telemetry system along the first and second sections of the wellbore 106.

Once the well 102 has been prepared and completed, the downhole communication network 122A-122F formed by the communication tags 122A-122F may be utilized to monitor nearby wellbore and/or hydrocarbon resource properties and to provide a telemetry system along the wellbore 106 for the rest of the operational lifetime of the well 102. FIG. 1C illustrates a production environment 180 in which the downhole communication network 122A-122F is deployed in the cement sheath 128 to determine nearby wellbore properties and facilitate communication between devices and tools deployed in the wellbore 106 and the controller 184. For example, the first communication tag 122A is operable to monitor the hydrocarbon resource production rate of hydrocarbon resources flowing out of perforations 141. Each of the communication tags 122A-122F is further operable to communicate with downhole tools and/or devices deployed within the casing 116 and to provide a telemetry system to facilitate communication between such tools and/or devices and the controller 184.

As stated herein, the communication tags 122A-122F are operable to determine nearby wellbore and/or hydrocarbon resource properties and are operable to store data indicative of the nearby wellbore and/or hydrocarbon resource properties. The communication tags 122A-122F are also operable to establish and maintain communication channels, such as acoustic and/or electromagnetic communication channels, to communicatively connect the communication tags 122A-122F. For example, first communication tag 122A establishes a first communication channel with second communication tag 122B to communicatively connect to the second communication tag 122B. The second communication tag 122B establishes a second communication channel with third communication tag 122C to communicatively connect to the third communication tag 122C. The third communication tag 122C establishes a third communication channel with fourth communication tag 122D to communicatively connect to the fourth communication tag 122D. The fourth communication tag 122D establishes a fourth communication channel with fifth communication tag 122E to communicatively connect to the fifth communication tag 122E. The fifth communication tag 122E establishes a fifth communication channel with sixth communication tag 122F to communicatively connect to the sixth communication tag 122F. The sixth communication tag 122F establishes a seventh communication channel with controller 184 to communicatively connect to the controller 184.

The controller 184 includes at least one surface based electronic device that is operable to receive signals and/or transmit signals to at least one of the communication tags 122A-122F. As such, a first communication path, which includes first through seventh communication channels, communicatively connects each of the first-sixth communication tags 122A-122F to the controller 184. Each of the first-sixth communication tags 122A-122F may continuously or periodically transmit signals indicative of nearby wellbore and/or hydrocarbon resource properties obtained by the respective communication tag 122A, 122B, 122C, 122D, 122E, or 122F along the first communication path to the controller 184. Similarly, the technician may operate the controller 184 to transmit signals to the first-six communication tags 122A-122F via the first communication path. Such transmitted signals may include commands to tools located in the wellbore or to specific communication tags. In some embodiments, a different communication path having a different number of communication channels may be established to communicatively connect a different number of communication tags to the controller 184.

In some embodiments, the communication tags 122A-122F are acoustic communication tags operable to establish acoustic communication channels, where an acoustic communication path is established from one or more of the foregoing acoustic communication channels. In other embodiments, the communication tags 122A-122F are electromagnetic communication tags operable to establish electromagnetic communication channels, where an electromagnetic communication path is established from one or more of the foregoing electromagnetic communication channels. In further embodiments, the communication tags 122A-122F are a mixture of acoustic communication tags and electromagnetic communication tags operable to establish acoustic communication channels and electromagnetic communication channels, respectively. In one of such embodiments, the communication tags 122A-122F are operable to form a communication path from both the acoustic communication channels and the electromagnetic communication channels.

The first communication tag 122A may also establish a communication channel with the downhole tool 124, thereby forming a second communication path that communicatively connects the controller 184 to the downhole tool 124. The technician may operate the controller 184 to transmit instructions via the second communication path to the downhole tool 124. Similarly, the downhole tool 124 may transmit signals indicative of measurements and/or status reports via the second communication path to the controller 184. Additional descriptions of communication channels, communication paths, as well as downhole and up-hole data transmission are provided in the below paragraphs and are illustrated in at least FIGS. 3A, 3B, and 4.

Figure 2:
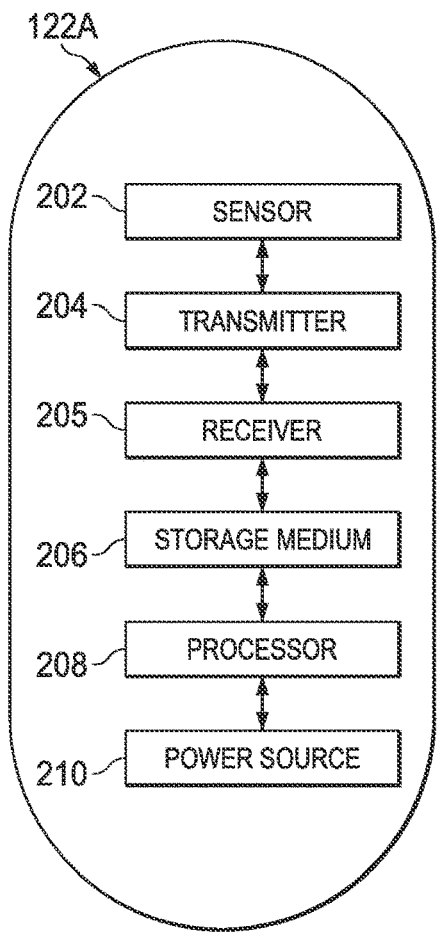
FIG. 2 illustrates a schematic view of a first communication tag of the downhole communication network that is deployed in the well environment of FIG. 1A.

FIG. 2 illustrates a schematic view of the first communication tag 122A of the downhole communication network 122A-122F that is deployed in the well environment 100 of FIG. 1A. The first communication tag 122A includes at least one sensor 202 that is operable to determine nearby wellbore and/or hydrocarbon resource properties. For example, the at least one sensor 202 may include a thermometer that senses a temperature of the wellbore 106 at a location proximate to the first communication tag 122A. The at least one sensor 202 may also include a pressure sensor that senses a pressure level of the wellbore 106 at the location proximate to first communication tag 122A. The at least one sensor may also include additional sensors operable to determine a vibration, displacement, velocity, torque, acceleration, conductivity, acoustic impedance, and other properties of the wellbore at the location proximate to the first communication tag 122A. In some embodiments, the at least one sensor 202 also includes sensors that are operable to detect presence of nearby hydrocarbon resources, water concentrations, or other chemical compositions of the wellbore at the location proximate to the first communication tag 122A. In one of such embodiments, the at least one sensor 202 also includes sensors that are operable to determine a distance from the nearby hydrocarbon resources to the first communication tag 122A. In further embodiments, the at least one sensor 202 may further determine the concentration of the nearby hydrocarbon resources. In further embodiments, the at least one sensor 202 may further determine the extraction rate of the nearby hydrocarbon resources. The one or more sensors 202 may further include additional sensors that are operable to determine additional nearby wellbore and/or hydrocarbon resource properties described herein.

The first communication tag 122A also includes a transmitter 204 that is operable to transmit signals indicative of wellbore properties, hydrocarbon resource properties, and/or instructions to other communication tags 122B-122F, the controller 184, or the downhole tool 124. In some embodiments, the transmitter 204 also includes a piezoelectric transmitter, a microelectromechanical transmitter, a shock or explosive transmitter, a mechanical impact transmitter, or another type of transmitter or transducer that is operable to transmit signals indicative of nearby wellbore and/or hydrocarbon resource properties or instructions to the other communication tags 122B-122F, the controller 184, or the downhole tool 124. The first communication tag 122A includes a receiver 205 that is operable to transmit acoustic, electromagnetic signals, or other types of signals to from the other communication tags 122B-122F, the controller 184, or the downhole tool 124, and further operable to receive signals from one or more of the foregoing devices. In some embodiments, the transmitter 204 and the receiver 205 are operable to transmit and to receive acoustic signals, respectively. In other embodiments, the transmitter 204 and the receiver 205 are operable to transmit and receive electromagnetic signals, respectively. In further embodiments, the first communication tag 122A includes multiple transmitters and receivers (not shown) operable to transmit and to receive acoustic signals, electromagnetic signals, as well as other types of communication signals indicative of wellbore and/or hydrocarbon resource properties. In some embodiments the transmitter 204 and the receiver 205 are components of a transceiver (not shown) that is also operable to receive acoustic signals, electromagnetic signals, and/or other types of signals from the other communication tags 122B-122F, the controller 184, or the downhole tool 124.

The first communication tag 122A also includes a storage medium 206. The storage medium 206 may be formed from data storage components such as, but not limited to, read-only memory (ROM), random access memory (RAM), flash memory, magnetic hard drives, solid state hard drives, as well as other types of data storage components and devices. In some embodiments, the storage medium 206 includes multiple data storage devices. The storage medium 206 includes instructions for operating one or more components of the first communication tag 122A. The storage medium 206 also includes an identification of the first communication tag 122A. The storage medium 206 also includes data indicative of nearby wellbore and/or hydrocarbon resource properties obtained by the at least one sensor 202 of the first communication tag 122A. In some embodiments, the storage medium 206 also includes data indicative of wellbore and/or hydrocarbon resource properties obtained by a sensor of another communication tag 122B-122F. In other embodiments, the storage medium 206 also includes instructions to operate the downhole tool 124 or data indicative of the status of the downhole tool 124. In further embodiments, the storage medium 206 also includes data indicative of the locations of other communication tags of the downhole communication network 122A-122F as well as the operational status of the other communication tags.

The first communication tag 122A also includes a processor 208 that is operable to execute the instructions stored in the storage medium 206 to determine nearby wellbore and/or hydrocarbon resource properties, to establish communication channels with other communication tags 122B-122F, the downhole tool 124, and/or the controller 184, and to perform other operations described herein. In some embodiments, the processor 208 is a sub-component of the sensor 202 or the transmitter 204. In further embodiments, the processor 208 is a separate component that utilizes the sensor 202, the transmitter 204, and the other components of the first communication tag 122A to perform the operations described herein. The first communication tag 122A further includes a power source 210 that provides power to the first communication tag 122A. In some embodiments, the power source 210 is a rechargeable power source. In one of such embodiments, the power source 210 is operable to convert kinetic energy, such as vibrations generated during hydrocarbon production or generated from the downhole tool 124, to electrical energy to recharge the power source 210. In other embodiments, the power source 210 is operable to convert thermal energy, such as through the use of thermoelectric devices, or chemical energy, such as through a reaction with substances found in the surrounding environment, to recharge the power source 210. In further embodiments, the power source 210 is operable to convert chemical energy to recharge the power source 210. As such, the power source 210 may be recharged at the downhole location where the first communication tag 122A is deployed.

Figure 3A:
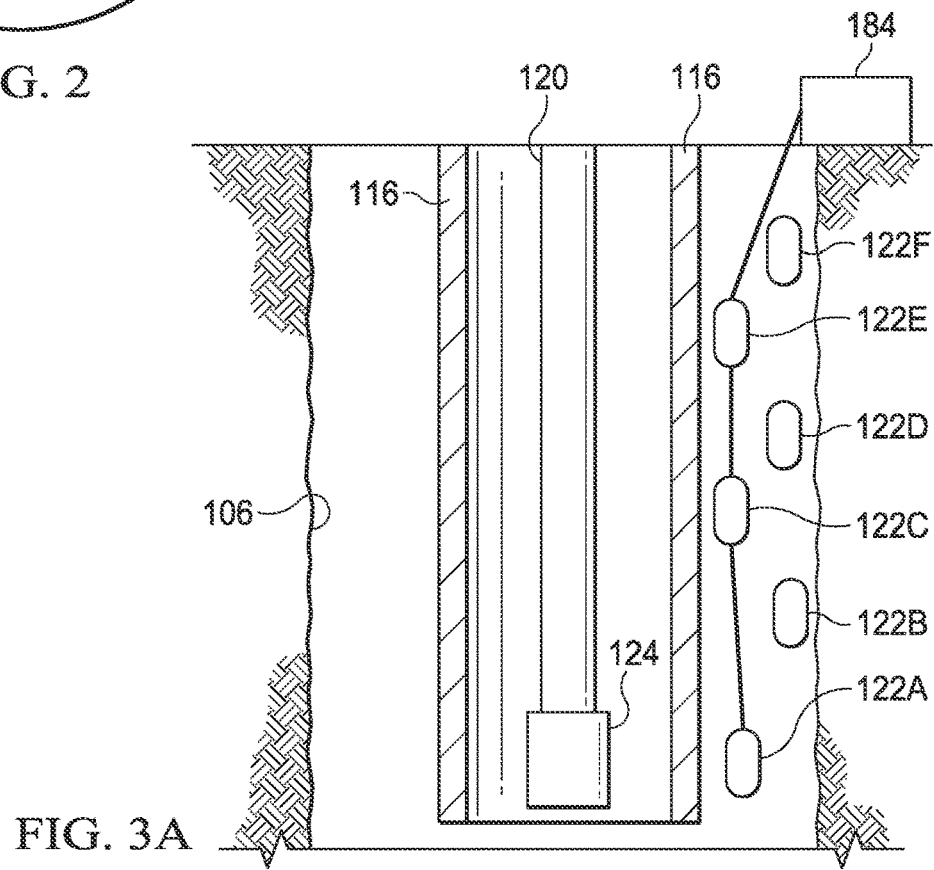
FIG. 3A illustrates a schematic view of a first communication path that communicatively connects a controller of FIG. 1A to multiple communication tags of the downhole communication network that is deployed in the well of FIG. 1A.

FIG. 3A illustrates a schematic view of a first communication path that communicatively connects the controller 184 of FIG. 1A to the first, third, and fifth communication tags 122A, 122C, and 122F of the downhole communication network 122A-122F. The first communication path includes a first communication channel that communicatively connects the first communication tag 122A to the third communication tag 122C, a second communication channel that communicatively connects the third communication tag 122C to the fifth communication tag 122E, and a third communication channel that communicatively connects the fifth communication tag 122E to the controller 184. Each of the first, the third, and the fifth communication tags may transmit data indicative of nearby wellbore and/or hydrocarbon resource properties obtained by at least one sensor of the respective communication tag along the first communication path to the controller 184. Further, the second, fourth, and sixth communication tags 122B, 122D, and 122F may also communicatively connect to at least one of the first, third, and fifth communication tags 122A, 122C, and/or 122E, and transmit data indicative of nearby wellbore and/or hydrocarbon resource properties to one of the at least one of the first, third and fifth communication tags 122A, 122C or 122E, where the transmitted data are further transmitted along the first communication path to the controller 184.

The communication channels may be established based on one or more standards or networking protocols, such as time division multiplexing (TDM), frequency division multiplexing (FDM), code division multiplexing (CDM), orthogonal frequency division multiplexing (OFDM), as well as other networking protocols disclosed herein. In some embodiments, the first communication tag 122A transmits a first signal containing a request for nearby communication tags to transmit a response signal upon receipt of the first signal. In one of such embodiments, the first signal is a pilot signal that also contains an identification of the first communication tag 122A as well as networking configurations of the first communication tag 122A. Nearby communication tags, 122B and 122C, each transmit a response signal upon receipt of the first signal. The response signal may also include a pilot signal that includes control, synchronization, equalization, as well as other information for establishing a communication channel with the respective communication tag 122B or 122C. The first communication tag 122A, upon receipt of response signals from nearby communication tags 122B and 122C, selects a communication tag to communicatively connect. The foregoing selection may be based on the signal strength of the response signal, the signal to noise ratio of the response signal, or by another criterion for establishing a communication channel in accordance to one or more standards or networking protocols.

In some embodiments, the first communication tag 122A may also establish a communication channel with the downhole tool 124, where the established communication channel is part of the first communication path. In one of such embodiments, the controller 184 may utilize the first communication path to transmit operational instructions to operate the downhole tool 124. Similarly, the downhole tool 124 may utilize the first communication path to transmit information obtained by the downhole tool 124 and the status of the downhole tool 124 to the controller 184.

Figure 3B:
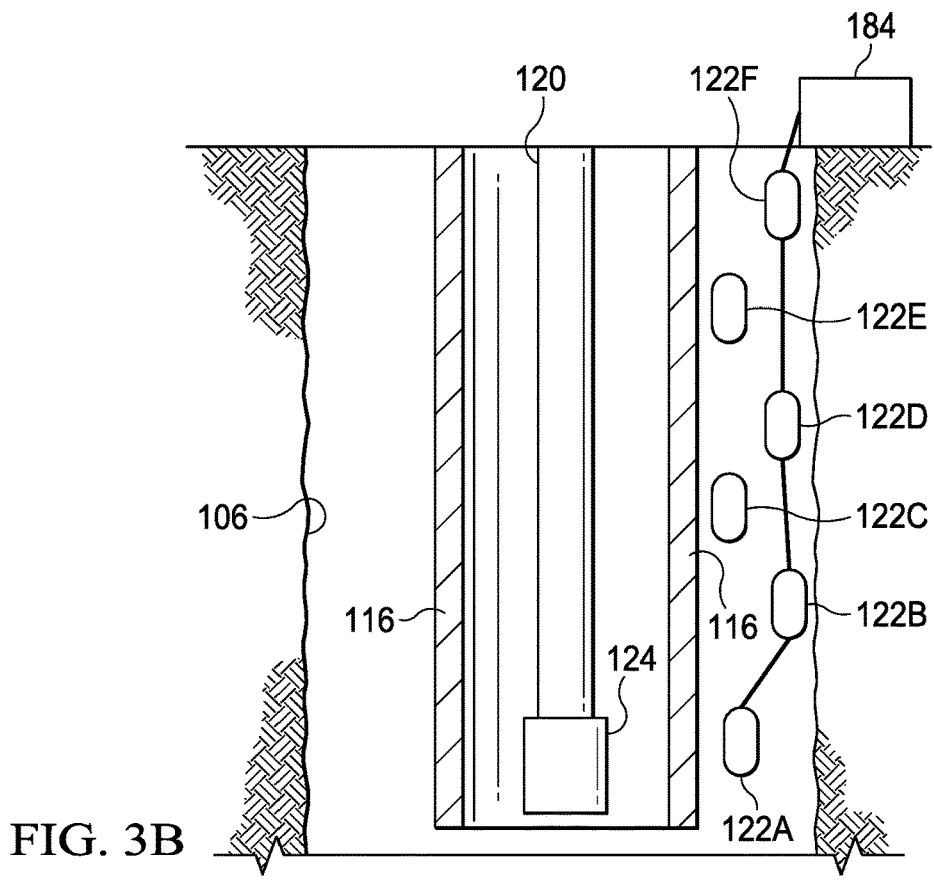
FIG. 3B illustrates a schematic view of a second communication path that communicatively connects the controller of FIG. 1A to multiple communication tags of the downhole communication network of FIG. 3A.

FIG. 3B illustrates a schematic view of a second communication path that communicatively connects the controller 108 of FIG. 1A to multiple communication tags 122A, 122B, 122D, and 122F of the downhole communication network 122A-122F of FIG. 3A. During the operational lifetime of the well 102, the location of one or more communication tags of the downhole communication network 122A-122F may change. As such, a more robust communication path may be established between a new set of communication tags of the downhole communication network 122A-122F. Further, one or more communication tags of the downhole communication network 122A-122F may suffer temporary or permanent malfunction, and the new set of communication tags may be utilized to establish a new communication path. The communication tags of the downhole communication network 122A-122F may dynamically establish new communication channels to remain communicatively connected to the controller 184. For example, if the third communication tag 122C of FIGS. 3A and 3B suffers a temporary malfunction, then the first communication tag 122A dynamically establishes a new communication channel (fourth communication channel) with the second communication tag 122B to communicatively connect to the second communication tag 122B. The second communication tag 122B establishes a new communication channel (fifth communication channel) with the fourth communication tag 122D to communicatively connect to the fourth communication tag 122D. Further, the fourth communication tag 122D establishes a new communication channel (sixth communication channel) with the sixth communication tag 122F to communicatively connect to the sixth communication tag 122F. Further, the six communication tag 122F establishes a new communication channel (seventh communication channel) with the controller 184 to communicatively connect to the controller 184. As such, a second communication path containing the fourth-seventh communication channels is dynamically established to communicatively connect the first, second, fourth, and sixth communication tags 122A, 122B, 122D, and 122F to the controller 184. The fifth communication tag 122E may communicatively connect to one of the first, second, fourth, and sixth communication tags 122A, 122B, 122D, and 122F, and may utilize the second communication path to transmit data indicative of nearby wellbore and/or hydrocarbon resource properties obtained by the fifth communication tag 122E to the controller 184.

In some embodiments, the first and second communication paths illustrated in FIGS. 3A and 3B are acoustic communication paths formed from multiple acoustic communication channels described herein. In other embodiments, the first and second communication paths illustrated in FIGS. 3A and 3B are electromagnetic communication paths formed from multiple electromagnetic communication channels described herein. In further embodiments, the first and second communication paths include both acoustic and electromagnetic communication channels described herein. In some embodiments, both the first and the second communications paths described in the foregoing paragraphs and illustrated in FIGS. 3A and 3B may be simultaneously formed and maintained. Moreover, certain communication tags, such as the first communication tag 122A of FIGS. 3A and 3B, are operable to establish multiple communication channels that form different communication paths, and also operable to transmit data along the multiple communication paths. In one of such embodiments, identical data may be transmitted along both the first and the second communication paths to implement network redundancy. In another one of such embodiments, the identical data transmitted are compared with each other to error check the data. In a further one of such embodiments, different data are transmitted along the first and the second communication channels to augment the data transfer rate of the communication tags 222A-222F. In that regard, one or more network protocols may be implemented to handle timing delays between the first communication and the second communication paths to facilitate data communication along both communication paths.

Figure 4:
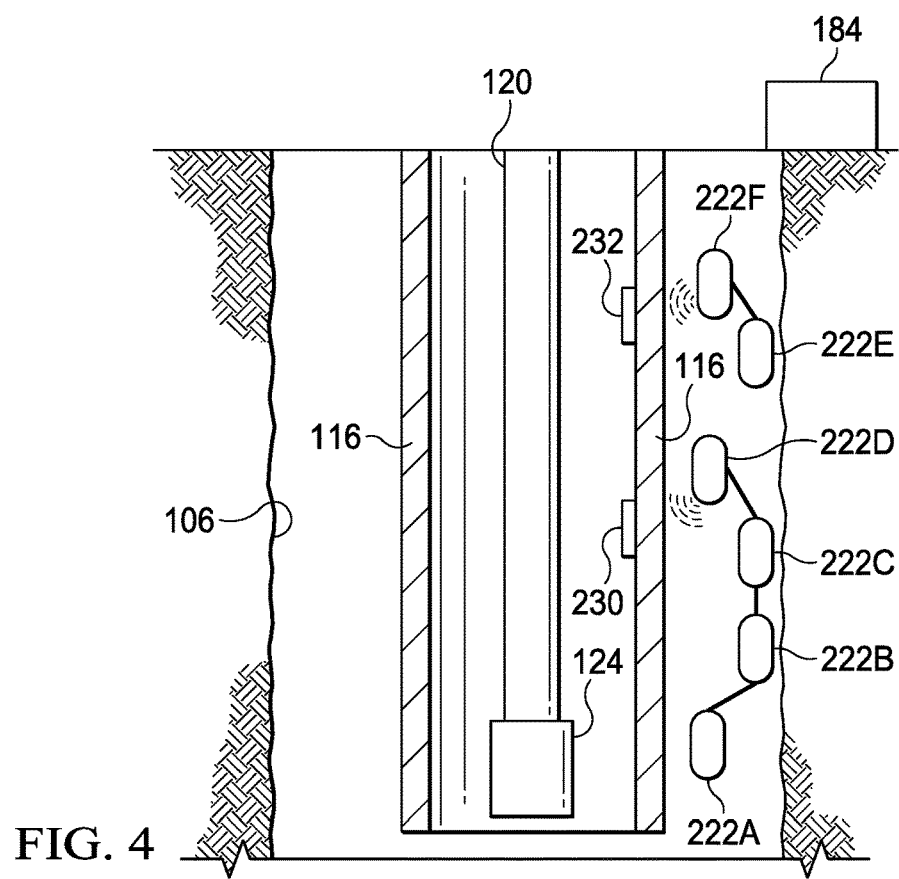
FIG. 4 illustrates two communication paths that communicatively connect multiple communication tags of the downhole communication network to downhole detectors.

FIG. 4 illustrates two communication paths that communicatively connect communication tags of the downhole communication network 222A-222F to downhole devices 230 and 232. In certain settings of the well environment 100, downhole devices, such as first and second downhole devices 230 and 232 are temporary or permanently deployed in the wellbore 106 to facilitate downhole and/or up-hole telemetry. The downhole devices 230 and 232 may include receivers and/or transceivers operable to receive signals from one or more of the communication tags of the downhole communication tag network 222A-222F, and provide the received signals to the controller 184. As such, communication paths may also be established to communicatively connect the communication tags 222A-222F to the first and second downhole devices 230 and 232. In the example of FIG. 4, a first communication path is established to communicatively connect the first-fourth communication tags 222A-222D to the first downhole device 230. Data indicative of nearby wellbore and/or hydrocarbon resource properties obtained by each of the first-fourth communication tags 222A-222D may be transmitted to the first downhole device 230 via the first communication path. Similarly, a second communication path is established to communicatively connect the fifth and sixth communication tags 222E and 222F to the second downhole device 232. Data indicative of nearby wellbore and/or hydrocarbon resource properties obtained by the fifth and sixth communication tags 222E and 222F may be transmitted to the second downhole device 232 via the second communication path. In another embodiment, data contained in the first or second downhole device 230 or 232, such as collar identity or local physical parameters, may be transmitted along a communication path formed of communication tags 222A-222F. The communication path may connect to a transceiver either at the surface or further up the wellbore but with poor or no telemetry link through the conveyance, such as for a traditional slickline tool.

In some embodiments, the two communication paths illustrated in FIG. 4 are acoustic communication paths formed from multiple acoustic communication channels described herein. In other embodiments, the two communication paths illustrated in FIG. 4 are electromagnetic communication paths formed from multiple electromagnetic communication channels described herein. In further embodiments, the two communication paths are formed from both acoustic and electromagnetic communication channels described herein. In some embodiments, the downhole tool 124 is communicatively connected to the controller 184 and is operable to receive signals from one or more of the communication tags 222A-222F. In one of such embodiments, a communication path (not shown) may also be formed to communicatively connect one or more of the communication tags 222A-222F to the downhole tool 124, where nearby wellbore and/or hydrocarbon resource properties obtained by the one or more communication tags 222A-222F may be transmitted to the downhole tool 124 for transmission to the controller 184. In another such embodiment, the downhole tool 124 may retrieve information stored by the first or second downhole devices 230 or 232. Communication between the downhole tool 124 and the first or second downhole devices 230 or 232 may be acoustic, inductive, electrical, optical, pressure-based, or any other communication mechanism.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a downhole communication network comprising a plurality of communication tags deployed in a wellbore, each communication tag of the plurality of communication tags comprising a sensor operable to detect at least one of wellbore and hydrocarbon resource properties proximate the respective communication tag; a transmitter operable to transmit a signal indicative of one or more of the at least one of wellbore and hydrocarbon resource properties; and a power source operable to provide power to one or more components of the respective communication tag.

Clause 2, the downhole communication network of clause 1, wherein the plurality of communication tags comprise a first communication tag and a second communication tag, the first communication tag being operable to establish a first communication channel with the second communication tag to communicatively connect the first communication tag to the second communication tag; and transmit, via the first communication channel, a first signal indicative of one or more of the at least one of wellbore and hydrocarbon resource properties proximate to the first communication tag to the second communication tag.

Clause 3, the downhole communication network of clause 1 or 2, wherein the second communication tag operable to establish a second communication channel with a third communication tag of the plurality of communication tags to communicatively connect the second communication tag to the third communication tag; and transmit, via the second communication channel, the first signal to the third communication tag.

Clause 4, the downhole communication network of any combination of clauses 1-3, wherein the third communication tag is operable to establish a third communication channel with a transceiver located at a surface location to communicatively connect the third communication tag to the transceiver; and transmit, via the third communication channel, the first signal to the transceiver, wherein the first communication channel, the second communication channel, and the third communication channel form a first communication path to communicatively connect the first, second, and third communication tags to the transceiver.

Clause 5, the downhole communication network of any combination of clauses 1-4, wherein the third communication tag is further operable to: receive a first request to configure a downhole tool communicatively connected to the first communication tag; and transmit, via the first communication path, the first request to the first communication tag, and wherein the first communication tag is further operable to transmit the first request to the downhole tool.

Clause 6, the downhole communication network of any combination of clauses 1-5, wherein one or more communication tags of the plurality of communication tags are operable to dynamically establish one or more communication paths between the first communication tag and the transceiver.

Clause 7, the downhole communication network of any combination of clauses 1-6, wherein the plurality of communication tags further comprise a fourth communication tag deployed proximate the first and third communication tags, wherein the first communication tag is further operable to: determine a status of the second communication tag; and establish a fourth communication channel with the fourth communication tag to communicatively connect the first communication tag to the fourth communication tag if the status of the second communication tag is determined to be offline, and wherein the fourth communication tag is operable to establish a fifth communication channel with the third communication tag to communicatively connect the fourth communication tag to the third communication tag.

Clause 8, the downhole communication network of any combination of clauses 1-7, wherein the first communication channel, the fourth acoustic communication channel, and the third communication channel form a second communication path to communicatively connect the first, third, and fourth communication tags to the transceiver.

Clause 9, the downhole communication network of any combination of clauses 1-8, wherein one or more of the plurality of communication tags are operable to simultaneously transmit data along both the first and the second communication paths.

Clause 10, the downhole communication network of any combination of clauses 1-9, wherein the sensor is operable to detect at least one of a temperature, a pressure, a pH, a resistivity, and a salinity of the wellbore proximate the sensor.

Clause 11, the downhole communication network of any combination of clauses 1-10, wherein the transmitter is further operable to transmit a signal indicative of an identification of the respective communication tag.

Clause 12, the downhole communication network of any combination of clauses 1-11, wherein the transmitter is further operable to transmit a signal indicative of a position of the respective communication tag.

Clause 13, the downhole communication network of any combination of clauses 1-12, wherein each communication tag of one or more communication tags of the plurality of communication tags further comprises a storage medium operable to store data indicative of the at least one of wellbore and hydrocarbon resource properties proximate the respective communication tag.

Clause 14, the downhole communication network of any combination of clauses 1-13, wherein the plurality of communication tags are acoustic tags, and wherein each acoustic tag of the plurality of acoustic tags comprises an acoustic transmitter operable to transmit an acoustic signal indicative of one or more of the at least one of wellbore and hydrocarbon resource properties.

Clause 15, the downhole communication network of any combination of clauses 1-13, wherein the plurality of communication tags are electromagnetic tags, and wherein each electromagnetic tag of the plurality of electromagnetic tags comprises an electromagnetic transmitter operable to transmit an electromagnetic signal indicative of one or more of the at least one of wellbore and hydrocarbon resource properties.

Clause 16, a method to form a downhole communication network, the method comprising establishing a first communication channel with a first communication tag of a plurality of communication tags deployed proximate a wellbore casing, each communication tag of the plurality of communication tags comprising a sensor operable to detect at least one of wellbore and hydrocarbon resource properties proximate the sensor; a transmitter operable to transmit a signal indicative of one or more of the at least one of wellbore and hydrocarbon resource properties; and a power source operable to provide power to one or more components of the respective communication tag; transmitting, via the first communication channel, a request to communicate with the first communication tag; and receiving, via the first communication channel, a first signal indicative of one or more of the at least one of wellbore and hydrocarbon resource properties.

Clause 17, the method of clause 16, further comprising dynamically establishing one or more new communication channels to communicatively connect the first communication tag to the transceiver.

Clause 18, the method of clause 16 or 17, further comprising periodically transmitting at least one of vibration and electromagnetic signals to the power source of the first communication tag, wherein the power source of the first communication tag is operable to harvest energy from the at least one of the vibration and the electromagnetic signals to recharge said power source.

Clause 19, a downhole communication tag comprising a sensor operable to detect at least one of wellbore and hydrocarbon resource properties proximate the respective communication tag; a storage medium operable to store data indicative of the at least one of wellbore and hydrocarbon resource properties proximate the respective communication tag; a transmitter operable to transmit a signal indicative of one or more of the at least one of wellbore and hydrocarbon resource properties; and a power source operable to provide power to one or more components of the respective communication tag.

Clause 20, the downhole communication tag of clause 19, wherein the sensor is operable to detect at least one of a temperature, a pressure, a pH, a resistivity, and a salinity of the wellbore proximate the sensor.

Unless otherwise specified, any use of any form of the terms "connect," "engage," "couple," "attach," or any other term describing an interaction between elements in the foregoing disclosure is not meant to limit the interaction to direct interaction between the elements and may also include indirect interaction between the elements described. As used herein, the singular forms "a", "an" and "the" are intended to include the plural forms as well, unless the context clearly indicates otherwise. Unless otherwise indicated, as used throughout this document, "or" does not require mutual exclusivity. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

It should be apparent from the foregoing that embodiments of an invention having significant advantages have been provided. While the embodiments are shown in only a few forms, the embodiments are not limited but are susceptible to various changes and modifications without departing from the spirit thereof

We claim:

1. A downhole communication network comprising:
a plurality of communication tags deployed in a wellbore, each communication tag of the plurality of communication tags comprising:
a sensor operable to detect at least one of wellbore and hydrocarbon resource properties proximate the respective communication tag;
a transmitter operable to transmit a signal indicative of one or more of the at least one of the wellbore and hydrocarbon resource properties; and
a power source operable to provide power to one or more components of the respective communication tag,
wherein each communication tag of the plurality of communication tags is deposited outside of a drill string, and
wherein each communication tag of the plurality of communication tag is operable to:
directly communicate with another communication tag of the plurality of communication tags;
determine if the other communication tag is offline;
in response to a determination that the other communication tag is offline;
establish communication with an alternative communication tag of the plurality of communication tags; and
transmit, to the alternative communication tag, the signal indicative of the one or more of the at least one of the wellbore and hydrocarbon resource properties proximate to the communication tag.

2. The downhole communication network of claim 1, wherein the plurality of communication tags comprise a first communication tag and a second communication tag, the first communication tag being operable to:
establish a first communication channel with the second communication tag to communicatively connect the first communication tag to the second communication tag; and
transmit, via the first communication channel, a first signal indicative of one or more of the at least one of the wellbore and hydrocarbon resource properties proximate to the first communication tag to the second communication tag.

3. The downhole communication network of claim 2, wherein the second communication tag operable to:
establish a second communication channel with a third communication tag of the plurality of communication tags to communicatively connect the second communication tag to the third communication tag; and
transmit, via the second communication channel, the first signal to the third communication tag.

4. The downhole communication network of claim 3, wherein the third communication tag is operable to:
establish a third communication channel with a transceiver located at a surface location to communicatively connect the third communication tag to the transceiver; and
transmit, via the third communication channel, the first signal to the transceiver,
wherein the first communication channel, the second communication channel, and the third communication channel form a first communication path to communicatively connect the first, second, and third communication tags to the transceiver.

5. The downhole communication network of claim 4, wherein the third communication tag is further operable to:
receive a first request to configure a downhole tool communicatively connected to the first communication tag; and
transmit, via the first communication path, the first request to the first communication tag, and
wherein the first communication tag is further operable to transmit the first request to the downhole tool.

6. The downhole communication network of claim 4, wherein one or more communication tags of the plurality of communication tags are operable to dynamically establish one or more communication paths between the first communication tag and the transceiver.

7. The downhole communication network of claim 6,
wherein the plurality of communication tags further comprise a fourth communication tag deployed proximate the first and third communication tags,
wherein the first communication tag is further operable to:
determine a status of the second communication tag; and
establish a fourth communication channel with the fourth communication tag to communicatively connect the first communication tag to the fourth communication tag if the status of the second communication tag is determined to be offline, and
wherein the fourth communication tag is operable to establish a fifth communication channel with the third communication tag to communicatively connect the fourth communication tag to the third communication tag.

8. The downhole communication network of claim 7, wherein the first communication channel, the fourth communication channel, and the third communication channel form a second communication path to communicatively connect the first, third, and fourth communication tags to the transceiver.

9. The downhole communication network of claim 8, wherein one or more of the plurality of communication tags are operable to simultaneously transmit data along both the first and the second communication paths.

10. The downhole communication network of claim 1, wherein the sensor is operable to detect at least one of a temperature, a pressure, a pH, a resistivity, and a salinity of the wellbore proximate the sensor.

11. The downhole communication network of claim 1, wherein the transmitter is further operable to transmit a signal indicative of an identification of the respective communication tag.

12. The downhole communication network of claim 1, wherein the transmitter is further operable to transmit a signal indicative of a position of the respective communication tag.

13. The downhole communication network of claim 1, wherein each communication tag of one or more communication tags of the plurality of communication tags further comprises a storage medium operable to store data indicative of the at least one of the wellbore and hydrocarbon resource properties proximate the respective communication tag.

14. The downhole communication network of claim 1, wherein the plurality of communication tags are acoustic tags, and wherein each acoustic tag of the plurality of acoustic tags comprises an acoustic transmitter operable to transmit an acoustic signal indicative of one or more of the at least one of the wellbore and hydrocarbon resource properties.

15. The downhole communication network of claim 1, wherein the plurality of communication tags are electromagnetic tags, and wherein each electromagnetic tag of the plurality of electromagnetic tags comprises an electromagnetic transmitter operable to transmit an electromagnetic signal indicative of one or more of the at least one of the wellbore and hydrocarbon resource properties.

16. A method to form a downhole communication network, the method comprising:
   establishing a first communication channel with a first communication tag of a plurality of communication tags deployed proximate a wellbore casing, each communication tag of the plurality of communication tags comprising:
      a sensor operable to detect at least one of wellbore and hydrocarbon resource properties proximate the sensor;
      a transmitter operable to transmit a signal indicative of one or more of the at least one of the wellbore and hydrocarbon resource properties; and
      a power source operable to provide power to one or more components of the respective communication tag;
   transmitting, via the first communication channel, a request to communicate with the first communication tag; and
   receiving, via the first communication channel, a first signal indicative of one or more of the at least one of the wellbore and hydrocarbon resource properties,
   wherein each communication tag of the plurality of communication tag is operable to:
      directly communicate with another communication tag of the plurality of communication tags;
      determine if the other communication tag is offline; and
      in response to a determination that the other communication tag is offline;
         establish communication with an alternative communication tag of the plurality of communication tags; and
         transmit, to the alternative communication tag, the signal indicative of the one or more of the at least one of the wellbore and hydrocarbon resource properties proximate to the communication tag.

17. The method of claim 16, further comprising dynamically establishing one or more new communication channels to communicatively connect the first communication tag to a transceiver located at a surface location.

18. The method of claim 16, further comprising periodically transmitting at least one of vibration and electromagnetic signals to the power source of the first communication tag, wherein the power source of the first communication tag is operable to harvest energy from the at least one of the vibration and the electromagnetic signals to recharge said power source.

19. A downhole communication tag comprising:
   a sensor operable to detect at least one of wellbore and hydrocarbon resource properties proximate the communication tag;
   a storage medium operable to store data indicative of the at least one of the wellbore and hydrocarbon resource properties proximate the communication tag;
   an transmitter operable to transmit a signal indicative of one or more of the at least one of the wellbore and hydrocarbon resource properties; and
   a power source operable to provide power to one or more components of the communication tag,
   wherein the communication tag is operable to:
      directly communicate with another communication tag of a plurality of communication tags that are disposed in the wellbore;
      determine if the other communication tag is offline; and
      in response to a determination that the other communication tag is offline;
         establish communication with an alternative communication tag of the plurality of communication tags; and
         transmit, to the alternative communication tag, the signal indicative of the one or more of the at least one of the wellbore and hydrocarbon resource properties proximate to the communication tag.

20. The downhole communication tag of claim 19, wherein the sensor is operable to detect at least one of a temperature, a pressure, a pH, a resistivity, and a salinity of a wellbore proximate the sensor.

* * * * *